(12) United States Patent
Karam et al.

(10) Patent No.: US 9,100,788 B2
(45) Date of Patent: *Aug. 4, 2015

(54) PROXIMITY SENSOR NETWORK (71) Applicant: AT&T Intellectual Property I, L.P., Atlanta, GA (US)

(72) Inventors: Gerald Karam, Morristown, NJ (US); Karrie Hanson, Westfield, NJ (US); Kermit Hal Purdy, Bernardsville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,337

(22) Filed: Feb. 11, 2014

(65) Prior Publication Data

US 2014/0159859 A1 Jun. 12, 2014

Related U.S. Application Data

(63) Continuation of application No. 12/315,564, filed on Dec. 4, 2008, now Pat. No. 8,674,829.

(51) Int. Cl.
*G08B 1/08* (2006.01)
*H04B 7/00* (2006.01)
*H04W 4/02* (2009.01)
*G08B 25/10* (2006.01)
*G07C 9/00* (2006.01)

(52) U.S. Cl.
CPC ............. *H04W 4/02* (2013.01); *G07C 9/00111* (2013.01); *G08B 25/10* (2013.01)

(58) Field of Classification Search
None
See application file for complete search history.

(56) References Cited

U.S. PATENT DOCUMENTS

| | | | |
|---|---|---|---|
| 5,208,756 A | 5/1993 | Song | |
| 5,572,216 A | 11/1996 | Weinberg et al. | |
| 7,327,229 B1 | 2/2008 | Nichols | |
| 8,674,829 B2 * | 3/2014 | Karam et al. ............ | 340/539.23 |
| 2001/0041588 A1 | 11/2001 | Hollstrom et al. | |
| 2002/0057192 A1 | 5/2002 | Eagleson et al. | |
| 2004/0183683 A1 * | 9/2004 | Funahashi ................. | 340/573.1 |
| 2005/0184862 A1 | 8/2005 | Nagata | |
| 2005/0237182 A1 | 10/2005 | Wang | |
| 2006/0056370 A1 | 3/2006 | Hancock et al. | |
| 2006/0061476 A1 * | 3/2006 | Patil et al. .................. | 340/572.4 |
| 2006/0164238 A1 | 7/2006 | Karaoguz et al. | |
| 2007/0075849 A1 | 4/2007 | Pitt | |
| 2007/0164845 A1 | 7/2007 | Ivins et al. | |
| 2008/0143482 A1 | 6/2008 | Shoarinejad et al. | |
| 2009/0027165 A1 | 1/2009 | Cristache | |
| 2010/0026479 A1 | 2/2010 | Tran | |

* cited by examiner

*Primary Examiner* — Brian Zimmerman
*Assistant Examiner* — Cal Eustaquio (57) ABSTRACT

A system, device and method for a proximity sensor network are disclosed. The proximity detection device includes a short range wireless receiver, a wireless network transceiver; and a controller connected to the receiver and transceiver. The device receives a short-range radio signal from a user's mobile communications device, and locates the user and takes various actions based on the identity of the user.

20 Claims, 5 Drawing Sheets

Receiving at a detection device, through a wireless connection, a transmitting mobile device identity. — 510

In response to receiving the mobile device identity, transmitting from the detecting device wirelessly the identity of the transmitting and an identity of the detection device. — 520

FIG. 5

PROXIMITY SENSOR NETWORK

CROSS REFERENCE TO RELATED APPLICATIONS

This application is a continuation of U.S. application Ser. No. 12/315,564, entitled "Proximity Sensor Network," filed on Dec. 4, 2008, issued as U.S. Pat. No. 8,674,829 on Mar. 18, 2014, the contents of which are incorporated herein by reference.

FIELD OF THE INVENTION

The present invention relates generally to communications systems and services, and more particularly, to a system, device and method for utilizing low-cost wireless sensors to detect presence or location of a device carried by a person, and to take actions based on the presence or location of the person.

BACKGROUND

Sensors are all around us. Sensors are transducers, in that they convert one form of energy into another. For example, widely available electrochemical sensor-based Carbon Monoxide (CO) detectors are installed in many homes and are used to detect the presence of CO as a result of incomplete combustion. Those sensors precisely measure current through a test cell. The current corresponds to CO level and an alarm is activated accordingly.

Advances in sensor miniaturization through microelectromechanical systems (MEMS), micromachining, photolithography and other miniaturization improvements have put sensors and detectors into places such as automotive brake shoes and bearing races that just a few short years ago were not technically or economically sensible.

Providing power to sensors in portable, moveable and out of the way places has significantly limited sensor use. Methods of extending battery or other on-board power supplies in order to extend a sensor system service life have focused mainly on improved battery technology and reducing system power requirements. To a lesser extent, methods of energy harvesting, such as piezoelectric vibration energy harvesting, have helped extend service life but remain costly to implement.

Business and home network administrators are increasingly looking to wireless networking technology to allow rapid and cost-effective changes to work space layout, network configuration and network capacity by deploying wireless networks that are easy to use, install and maintain, all without compromising system performance or security. Low range wireless networking protocols, such as but not limited to, 802.11x protocol, WI-FI wireless networking technology, Ultra-Wideband (UWB), Wireless USB (WUSB), BLUETOOTH wireless networking protocol, ZIGBEE wireless open standard technology and the like, facilitate communication between compatible wireless devices. Those wireless communication technologies have been applied to sensors.

Sensors have been used to identify or track persons in a building. Motion sensors have been used to detect the presence of a person, but are not effective in identifying the person. Fingerprint sensors and retina scanners have been used in security systems to identify persons, but those sensors require active participation by the identified person. Similarly, face and voice recognition software has been used to identify persons, but those techniques also require the active participation by the subject to produce reliable identification. Key fobs and ID cards have been used to identify persons in a building, but those devices must be carried by persons for the purpose of being identified by the system.

It would therefore be desirable to provide systems and methods for identifying and tracking persons within a building, and taking actions based on that identification, without requiring the persons to take affirmative measures to identify themselves to the system. To the inventors' knowledge, no such system or method currently exists.

SUMMARY OF THE INVENTION

In accordance with a first aspect of the present invention, there is disclosed a proximity detection device. The device comprises: a short range wireless receiver for receiving an identifier of a mobile communications device; a wireless network transceiver; and a controller connected to each of the short range wireless receiver and the wireless network transceiver, the controller including a processor and a memory containing instructions that, when executed by the processor, cause the processor to perform the steps of receiving the identifier from the short range wireless receiver, in response to receiving the identifier, composing a message based at least in part on the identifier, and transmitting the message to a data network through the wireless network transceiver.

The short range wireless receiver may be a receiver utilizing a protocol selected from the group consisting of BLUETOOTH wireless networking protocol, near field communication, ultra wide-band and infrared. The wireless network transceiver may utilize an 802.11x protocol. The wireless network transceiver may be a low power device that consumes less than 1 Watt at full-rate active receive power.

The message may comprise at least an identification of a mobile communications device and an identification of the proximity detection device.

The device may further comprise at least one sensor connected to the processor for measuring an environmental characteristic; and wherein the message further comprises a measurement from the sensor. The sensor may be a sensor selected from the group consisting of a microphone, a temperature sensor, a humidity sensor, a camera, a barometric pressure sensor and a light sensor.

In accordance with another aspect of the present invention, there is disclosed a proximity detection system. The system comprises a plurality of detection devices, each detection device comprising a short range wireless receiver for receiving a signal containing an identifier of a mobile communications device, a wireless network transceiver; and a controller connected to each of the short range wireless receiver and the wireless network transceiver, for transmitting to a data network through the wireless network transceiver, in response to receiving an identifier from the short-range wireless receiver, a message based at least in part on the identifier; a wireless base station for communicating with the wireless network transceivers, the base station being connected to a data network; and a manager application in the data network configured for receiving data from a detection device including the mobile communications device identifier and an identifier of the detection device, and performing a detection task based on the mobile communications device identifier.

The detection task may include determining a location of a mobile communications device based at least in part on a detection device identifier.

The manager application may receive an identifier of a first mobile communications device from at least two detection devices substantially simultaneously, in which case the detection task includes calculating a location of the mobile communications device based on predetermined positions of the at least two detection devices.

The system may further comprise an appliance controller connected for controlling an appliance and in communication with the data network; the detection task including controlling an appliance through the appliance controller in response to receiving the data at the manager application. The appliance controller may be connected for controlling an appliance selected from the group consisting of room lighting, HVAC, audio equipment, video equipment and security equipment or the manager application includes a database containing predetermined appliance states associated with particular mobile communications device identifiers, and the detection task includes controlling an appliance through the appliance controller to adopt a state associated in the database with the particular mobile communications device identifier.

14. The detection task may also include determining a location of a particular mobile communications device based on a location technique applied to at least one signal received by the short range wireless receivers, the technique selected from a group consisting of a signal strength technique, a time difference of arrival technique and a signal echo technique.

The wireless network transceiver may be a low power device that consumes less than 1 Watt at full-rate active receive power.

In accordance with a third aspect of the invention, there is disclosed a method for determining a location of a mobile communications device. The method comprises the steps of: receiving at a detection device through a short range wireless connection, a signal containing a mobile communications device identity of a transmitting mobile communications device; and in response to receiving the device identity, transmitting from the detection device through a wireless network transceiver, a message containing the identity of the transmitting mobile communications device and an identity of the detection device, the message defining the location of the mobile communications device.

The step of receiving the mobile communications device identity may comprise receiving utilizing a protocol selected from the group consisting of BLUETOOTH wireless networking protocol, near field communication, ultra wide-band and infrared.

The step of transmitting the identities may comprise utilizing an 802.11x protocol.

The method may further comprise the steps of taking a measurement of at least one environmental characteristic; and, in response to receiving a particular device identity, transmitting from the detection device through the wireless network transceiver, data representing the measurement.

The method may further comprise the steps of determining a signal strength of a signal received through the short range wireless connection; and transmitting from the detection device through the wireless network transceiver data representing the signal strength.

These aspects of the invention and further advantages thereof will become apparent to those skilled in the art as the present invention is described with particular reference to the accompanying drawings.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The invention utilizes small, low-cost, sensors and detectors integrated into low-cost wireless network enabled network access devices (NADs.) The NADs may be configured to form a low-cost wireless network. In alternative embodiments, the NADs may be disposable, or may be low power devices consuming less than 1 Watt at full-rate active receive power.

Figure 1:
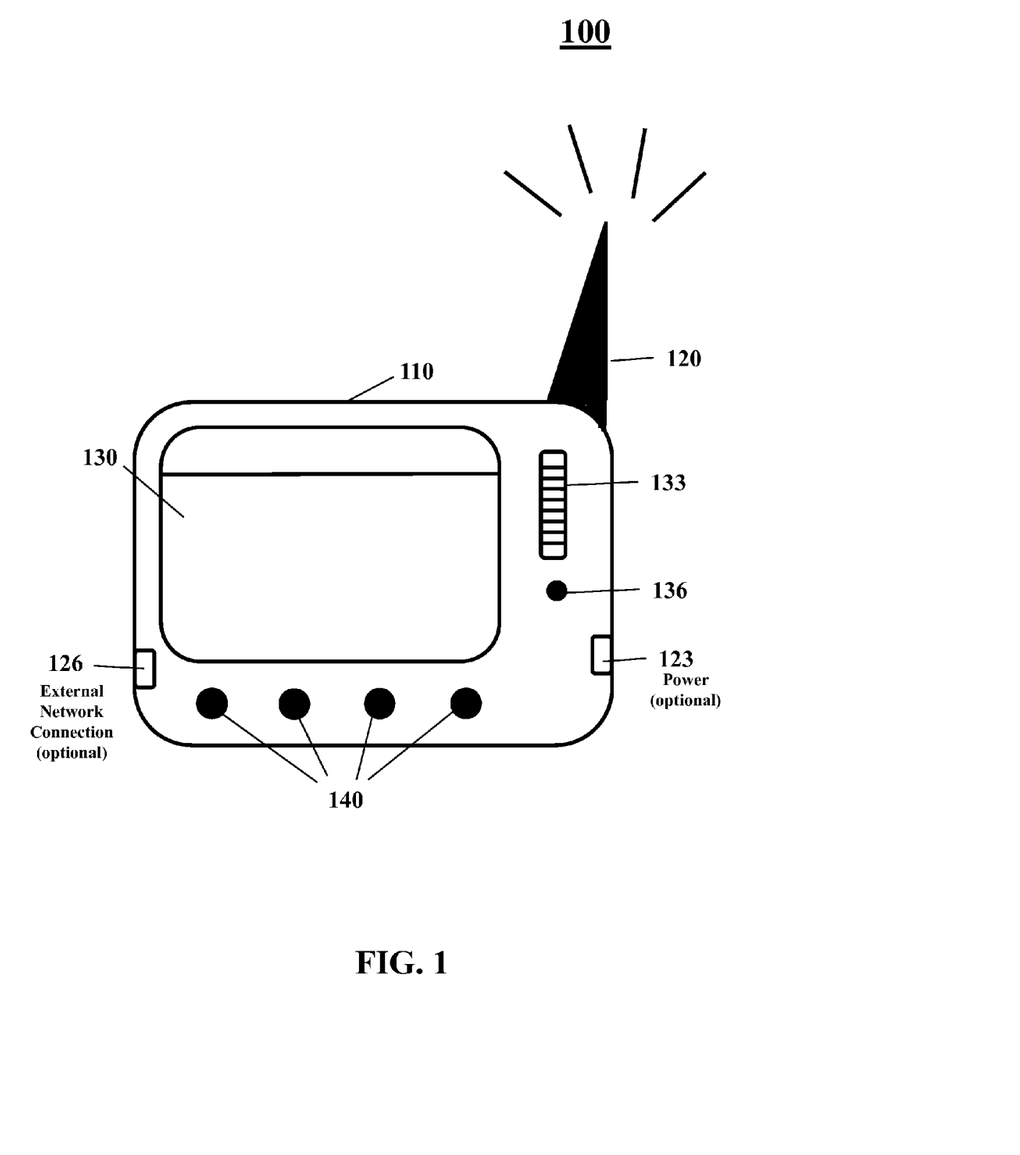
FIG. 1 is an exemplary wirelessly enabled network access device (NAD) in accordance with the present invention.

FIG. 1 is an exemplary wirelessly enabled NAD 100 in accordance with the present invention. The exemplary device 100 is a full-featured battery-powered version. Actual devices may have more or less functionality. The device 100 includes a housing 110 that contains the components of the device. An antenna 120, shown as external but alternatively internal to the device, is provided to facilitate two-way communication over a wireless network (not shown). The NAD 100 communicates with a device manager (not shown) using a low range wireless networking protocol, such as but not limited to 802.11x/WI-FI wireless networking technology, UWB, WUSB, BLUETOOTH wireless networking protocol and ZIGBEE wireless open standard technology via a WLAN to a LAN (not shown). The device includes a memory/storage device and a processor (not shown).

The device 100 may include a battery (not shown) or other local power providing device. An optional power input 123 may connect to externally supplied power, and an optional external network connection 126 enables hard-wired communication.

An optional user interface includes a display 130 with a spin dial 133 and select button 136, for displaying information and navigating content. Alternatively, other display/navigation technologies could be used, such as a touch screen or similar, providing the device with desired interface functionality. Display/navigation methodologies such as tactile displays or other adaptive technologies may be incorporated into the device, allowing users with varying physical abilities of vision and hearing to use the device. Other user interface output capabilities, such as a speaker for audio communication with a user, may also be included.

Four discrete input/output (I/O) sensors or detector devices 140 are shown in the exemplary device 100. A configuration containing a greater or smaller number of devices is possible.

Examples of I/O devices include, but are not limited to, devices for sensing temperature, humidity, atmospheric pressure, light intensity, smoke, gas, audio (input and/or output), human presence and motion. Other examples of I/O devices include wireless protocol receivers and wireless protocol transceivers. Sensor and detector devices may be replaceable. The NAD devices 100 may be configured in a variety of ways. For example, a device may have only a single sensor with no display/navigation functionality. Another example is a full-featured device 100 having content distribution functionality.

Figure 2:
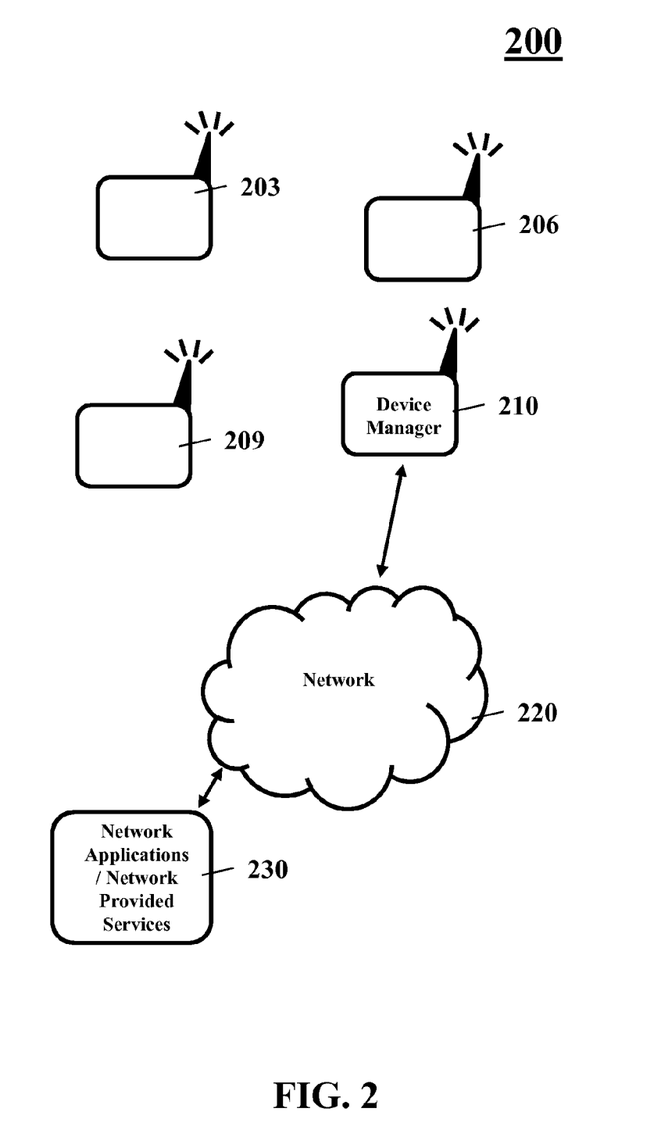
FIG. 2 is an exemplary wireless local area network (WLAN) system in accordance with the present invention.

FIG. 2 is an exemplary wireless local area network (WLAN) system 200 with limited functionality, in accordance with the present invention. Individual battery-powered access point NADs 203, 206 and 209 are communicating via a wireless protocol with a device manager 210 over a low WLAN. In this example the NADs 203, 206, 209 are measuring room temperature and passing the measurements to the device manager 210. The NADs 203, 206, 209 have no display or user interface, their functionality is limited to measurement reporting. The device manager 210 may itself be a NAD of the present invention or may just be a gateway through which information flows. The device manager 210 may be battery-powered like the other NADs (203, 206, 209) or plugged into a power supply such as a wall socket. A standard device connection connects the device manager 210 to a network 220, such as the Internet. The network 220 may connect to network applications or services 230. In an alternative embodiment, the device manager 210 may be connected to a computer, a NAD or processor (not shown) which in turn is connected to the network 220.

Once the temperature information is gathered by the NADs 203, 206, 209, sent to and aggregated by the device manager 210, the information may be processed either locally by the device manager 210 or passed through the network 220 for processing remotely by the network applications or services 230.

In this example, a network-provided service for monitoring room temperature may process the data.

If the system of FIG. 2 were used in an industrial environment, for example, NAD 203 could record the temperature in a office building which, when processed locally by the device manager 210, will send an "alarm" when a given room temperature exceeds a maximum limit of say 80° F. If the system were used in a home environment, for example, NAD 203 could record the temperature in an attic which, when processed remotely by the network applications/network provided services 230, will send an "alarm" when the attic temperature exceeds an upper limit of say 125° F. That may indicate the failure of an attic fan, for example, and should be investigated by the homeowner or a contractor. The "alarm" in the above two examples could be an audible alarm, an email or a phone call to an individual, or it could be an input to a larger environmental/security/control system to feedback and adjust the control system(s), such as calling for more air conditioning or calling a contractor. Independent of the "alarm" conditions, a user could monitor, either locally or remotely, the actual data gathered and any processed data/charts as well.

Figure 3:
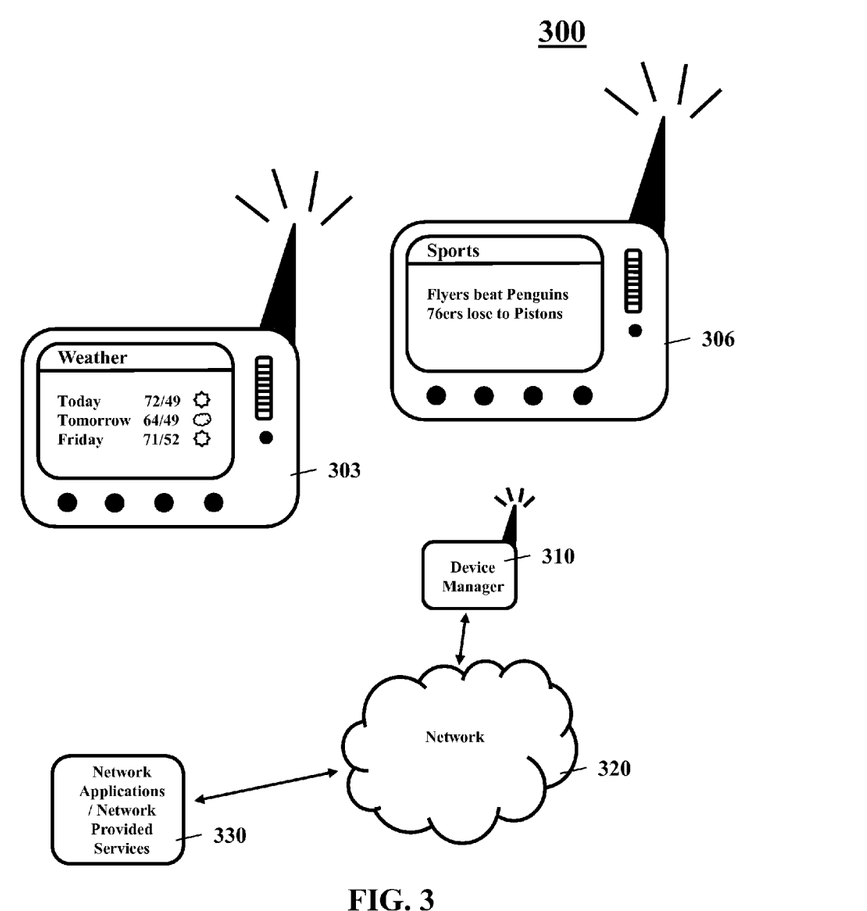
FIG. 3 is an exemplary wireless local area network (WLAN) system with distributed content functionality, in accordance with the present invention.

FIG. 3 is an exemplary wireless local area network (WLAN) system 300 with content distribution functionality, in accordance with the present invention. Individual battery-powered access NADs 303 and 306 are communicating via a wireless protocol with the device manager 310 over a WLAN. In this example, NADs 303 and 306 are full-featured devices that are designated to distribute media content. The manager application controlling the information sent to NADs 303 and 306 may be local, such as part of the device manager 310, or remote, via network applications/network provided service 330. In this example, NAD 303 may be located in a bedroom or dressing area displaying the weather, while NAD 306 may be located in a home kitchen displaying the overnight sports scores. Each NAD in this example is also enabled with the capability to access the Web, access email, access instant messaging or other services as accessible over the Internet. Individual NADs may be tailored to individual needs. In an alternative embodiment, a NAD in a child's room is programmed to receive reminders from her personal calendar and the telephone numbers of the last five calls she made on her cell phone. In another alternative embodiment, a NAD in the family room is programmed to receive reminders of what is coming up on the family's favorite TV channel, along with what has been recently added to the digital video recorder, and the telephone numbers of the last five calls made on the house phone. In another alternative embodiment, a NAD is used as an interface to control a home media center or even query the media center to determine what is playing. By adding the functionality of proximity detection and the ability to uniquely identify mobile communication device enabled for short range wireless communication (see FIG. 4 description for greater detail), yet another alternative embodiment can deliver the above described personalized content, such as the overnight sports scores, to the NAD closest to the mobile communications device being carried by an individual, rather than just sending the content to a designated NAD in a fixed location.

Figure 4:
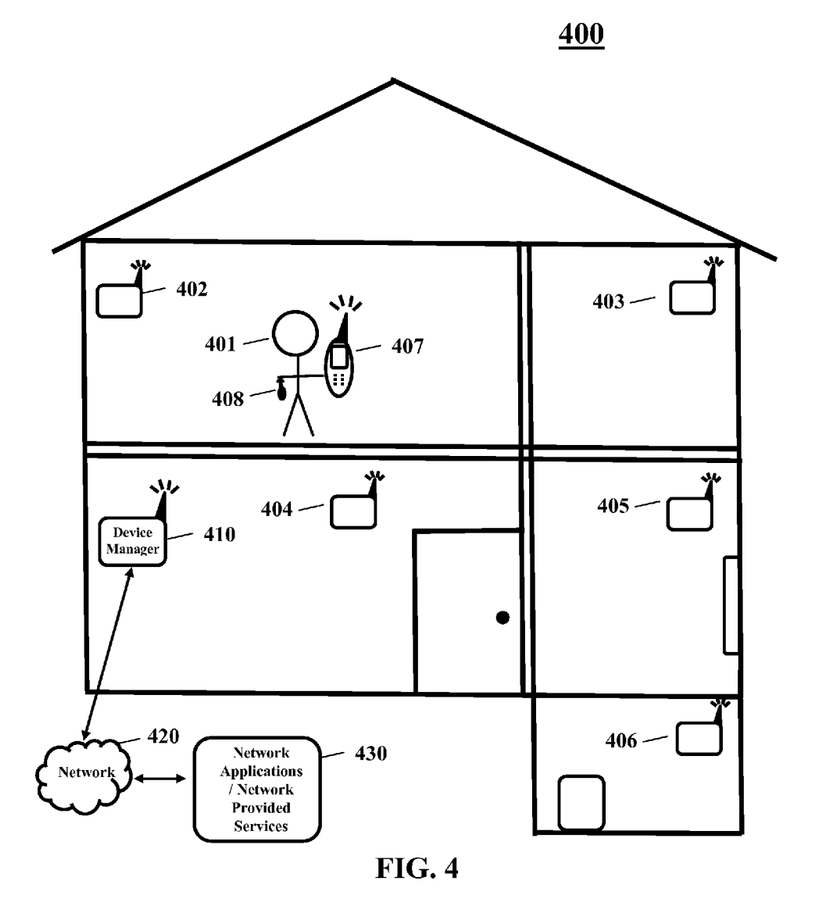
FIG. 4 is an exemplary wireless local area network (WLAN) system with sensor enabled functionality, in accordance with the present invention.

FIG. 4 is an exemplary wireless local area network (WLAN) system 400 with sensor-enabled functionality, in accordance with the present invention. Individual battery-powered access NADs 402, 403, 404, 405, and 406 communicate via a wireless protocol with the device manager 410 over a WLAN. In this example the NADs 402, 403, 404, 405, and 406 contain sensors used for monitoring proximity, presence or location of persons within a home, together with sensors used in home automation. NADs 404 and 405 are located on the ground floor, and both are equipped with a motion sensor, a heat sensor, picture and video capability, and audio sensing capability. NAD 404 is within a space containing the front door, while NAD 405 is in a room with a large window.

Information from the sensors in the NADs may be used to trigger actions taken by the system. In an example providing for home security, an "alarm" may be generated by motion, heat or audio sensing. In response to the alarm, the audio, picture and video sensors increase their sampling frequency and send streaming data to the device manager 410, through the network 420 to the network applications/network provided services 430. The network applications/network provided services 430 are programmed to send an alarm in the form of a call, email, Instant Message and/or SMS Text to contact a designated person. The alarm may indicate the possibility of a break-in and send the streaming pictures, video and audio to a security service or law enforcement representatives.

In another embodiment, the NADs 402, 403, 404, 405, and 406 may be integrated into part of a larger home automation/security/law enforcement/emergency services system. NAD 406 is located in the furnace room, and is equipped with smoke and CO sensors. When any of the sensors send an "alarm," a message is sent to contact a designated person indicating a message of a possible malfunction of the furnace or a fire. The same message may also be sent to the local law enforcement and emergency services representatives.

Continuing to refer to FIG. 4, a user 401 located in an upstairs room of the model house is carrying a cell phone, PDA or another mobile communications device 407 enabled for short range wireless communication such as using BLUE-TOOTH wireless networking protocol. Many modern mobile communications devices are equipped with such short range wireless communication capability in addition to the primary wireless transceiver. The short range wireless capability may be used in various local applications including the use of a "hands-free" device and transmission of directory information.

The NAD 402 receives a radio signal from either the primary or the short range transceiver of the mobile communications device 407. That signal includes identification information of the mobile communications device. The NAD 402 combines that identification information with location or presence information derived from the signal. The information may be used for updating family and friends as to a person's location, microblogging and folksonomy or social networking applications. As an alternative to a mobile communications device such as a cell phone or PDA, users may carry a key fob 408 or similar device to wirelessly provide identification and positioning information. With multiple NADs 402, 403, 404, 405, 406 distributed in a home or office, as shown in FIG. 4, signal strength among NADs may be compared to better resolve the position of the user within the home or office environment. Other methods may also be utilized to determine proximity, such as Time Difference of Arrival (TDOA) and signal echo, as known by those skilled in the art.

When a user is in a public space with device compatible wireless networking coverage, such as an internet café or a public town space, similar location or presence information could be gathered and provided to applications as previously discussed. Transportation vehicles such as trains, subways, airplanes, buses, automobiles, taxis and limousines may also be equipped with compatible devices providing identification and positioning information.

Again referring to FIG. 4, the NAD 402 is located within a home office environment, where a user 401 has may have specific preferences to lighting, temperature and music. In that arrangement, the system may include an appliance controller either locally within the building or on the network 420. The appliance controller controls appliances such as room lighting, HVAC, audio and video equipment and security equipment. The user's preferences may be triggered to take effect when the user enters the room and is identified by the system. For example, the system may include a database containing predetermined appliance states associated with particular users as identified by their mobile communications devices. The appliance controller looks up the mobile device identifier in the database to determine appliance states associated with the particular mobile communications device identifiers, and causes the appliances to assume those states. The system may return to a standby mode 30 minutes after the user has left the room.

The presence functionality of the present invention is completely passive on the user's part. The user need do nothing for the system to implement his preferences.

The location/presence functionality of the present invention may also be used in routing an incoming communication such as a telephone call. In that embodiment, a user's location is reported as near the NAD 402, at home, and the system routes the call to his home telephone network. If the home telephone network is busy, the system may re-route the call back to the user's cell phone. In another embodiment, the user 401 wishes to make a cell phone call. Again, based on location/presence functionality, his location is determined to be near the NAD 402, at home, and when he places the call with his cell phone 407, it is placed over his home telephone network or data network instead of the cell network.

In another example, the cleaning staff may be granted access to certain areas only when escorted by a particular person or persons, and only at certain times. The system of the invention may identify a cleaning staff member and an authorized escort to be proximate a particular sensor at a particular time, and grant access accordingly. The availability of always-on Internet connectivity additionally enables delivery of customizable information and content services to a wireless sensor network or other network enabled devices, based on sensor input and user preferences.

In yet another alternative embodiment, a business may utilize the presently described system's ability to identify a customer to enhance the customer's experience. For example, if the business is an auto parts store, a display behind the counter would immediately indicate to a salesperson the make/model/year of the client's vehicles, including recent purchases. If the business is a beauty salon, the receptionist could immediately be shown the client's preferred stylist and typical treatments. If the business is a restaurant or bar, the maitre d' could immediately be shown a customer's seating preferences and food or drink preferences and could anticipate those needs. Further, with knowledge of a customer's preferences, a restaurant or bar may push messages, via IM or text message for example, to a frequent customer alerting him when a preferred seat is available at a preferred time, or when a favorite meal or drink is a special.

Figure 5:
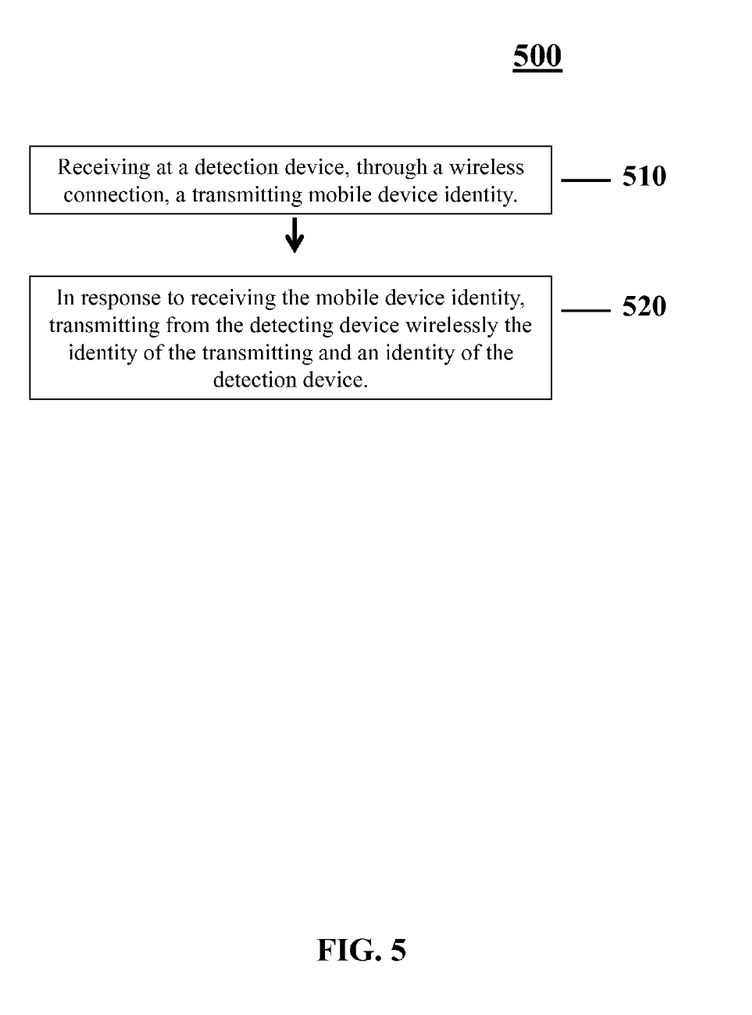
FIG. 5 is flowchart of an exemplary method of use in accordance with the present invention.

FIG. 5 is flowchart of an exemplary method 500 in accordance with the present invention. The method detects proximity of a mobile communications device, such as a cellular telephone.

A mobile communications device identity of a transmitting mobile communications device is received (step 510) at a detection device through a short range wireless connection. In response to receiving the device identity, the identity of the transmitting mobile communications device and the identity of the detection device are transmitted (step 520) from the detection device through a wireless network transceiver.

In summary, the availability of low-cost sensors and detectors, combined with low cost wireless technology, makes possible the cost-effective deployment, operation and maintenance of a battery-powered, wireless sensor network. Sensor technology detecting human presence and uniquely identifying individuals or types of individuals permits customized responses, when combined with a sensor network.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A device manager system for granting access, comprising:
a detection device comprising a short range wireless transceiver, a first wireless local area network transceiver, a processor and a memory containing instructions that, when executed by the processor, cause the short range wireless transceiver to receive a short range radio signal transmitted by a mobile cellular voice communications device, the short range radio signal containing an identifier of the mobile cellular voice communications device, the instructions further causing the first wireless local area network transceiver to transmit via a local area network, in response to receiving the short range radio signal, a message containing information on a time difference of arrival of the short range radio signal as received by the detection device, an identifier of the detection device and the identifier of the mobile cellular voice communications device;

a device manager in the local area network comprising a second wireless local area network transceiver, a processor and a memory, the memory containing instructions that, when executed by the processor, cause the processor to receive the message via the second wireless local area network transceiver and to perform a detection task, the detection task comprising determining a location of the mobile cellular voice communications device using the information contained in the message, determining a location of a second mobile cellular voice communications device using a second message, and granting to a user of the mobile cellular voice communications device access to a physical area based on proximities of both the mobile cellular voice communications device and the second mobile cellular voice communications device to the detection device.

2. The device manager system of claim 1, wherein the device manager receives an identifier of the first mobile cellular voice communications device from at least two detection devices, and the detection task includes determining a location of the mobile cellular voice communications device based on predetermined positions of the at least two detection devices and on a time difference of arrival of the short range signals received by each one of the at least two detection devices.

3. The device manager system of claim 1, further comprising:
an appliance controller connected for controlling an appliance and in communication with the local area network; and
the detection task including controlling an appliance through the appliance controller in response to receiving the transmitted data.

4. The device manager system of claim 3, wherein the appliance controller is connected for controlling an appliance selected from the group consisting of room lighting, HVAC, audio equipment, video equipment and security equipment.

5. The system of claim 3, wherein the device manager includes a database containing predetermined appliance states associated with particular mobile cellular voice communications device identifiers, and the detection task includes controlling an appliance through the appliance controller to assume a state associated in the database with the particular mobile cellular voice communications device identifier.

6. The system of claim 1, wherein the first wireless local area network transceiver is a low power device that consumes less than 1 Watt at full-rate active receive power.

7. The system of claim 1, wherein the local area network utilizes an 802.11x wireless networking protocol.

8. The system of claim 1, wherein the short range wireless transceiver utilizes a Bluetooth wireless networking protocol.

9. The system of claim 1, wherein the detection task further comprises updating a third party as to the location of the mobile cellular voice communications device.

10. A method for granting access using a location of a mobile cellular voice communications device, comprising:
receiving, at a detection device, a short range wireless signal containing an identity of a first mobile cellular voice communications device, the short range wireless signal originating from a short range wireless transceiver of the first mobile cellular voice communications device;
determining a proximity of the first mobile cellular voice communications device to the detection device based on a time difference of arrival of the short range signal;
in response to receiving the short range signal, transmitting, by a wireless local area network transceiver of the detection device, a message containing the first mobile cellular voice communications device identity and the proximity of the first mobile cellular voice communications device to the detection device;
transmitting from the detection device through the wireless local area network transceiver, a message containing a second mobile cellular voice communications device identity and a proximity of a second mobile cellular voice communications device to the detection device; and
granting to a user of the first mobile cellular voice communications device access to a physical area based on the proximities to the detection device of both the first mobile cellular voice communications device and the second mobile cellular voice communications device.

11. The method of claim 10, wherein the device manager receives an identifier and a proximity of the first mobile cellular voice communications device from at least two detection devices, the method further comprising:
determining a location of the mobile cellular voice communications device based on predetermined positions of the at least two detection devices and on a time difference of arrival of the short range signals received by each one of the at least two detection devices.

12. The method of claim 10, further comprising:
in response to receiving the transmitted message, controlling an appliance through an appliance controller connected to the local area network.

13. The device manager system of claim 12, wherein the appliance is selected from the group consisting of room lighting, HVAC, audio equipment, video equipment and security equipment.

14. The system of claim 12, wherein the device manager includes a database containing predetermined appliance states associated with particular mobile cellular voice communications device identifiers, and controlling the appliance comprises controlling the appliance to assume a state associated in the database with the particular mobile cellular voice communications device identifier.

15. The system of claim 10, wherein the detection device receives the short range wireless signal via a low power transceiver that consumes less than 1 Watt at full-rate active receive power.

16. The system of claim 10, wherein the wireless local area network transceiver utilizes an 802.11x wireless networking protocol.

17. The system of claim 10, wherein the short range wireless transceiver utilizes a Bluetooth wireless networking protocol.

18. The system of claim 10, further comprising:
updating a third party as to the location of the mobile cellular voice communications device.

19. A device manager system for granting access, comprising:
a detection device comprising a short range wireless transceiver, a first wireless local area network transceiver, a processor and a memory containing instructions that, when executed by the processor, cause the short range wireless transceiver to receive a short range radio signal transmitted by a mobile cellular voice communications device, the short range radio signal containing an identifier of the mobile cellular voice communications device, the instructions further causing the first wireless local area network transceiver to transmit via a local area network, in response to receiving the short range radio signal, a message containing information on a signal strength of the short range radio signal as received by the detection device, an identifier of the detection device and the identifier of the mobile cellular voice communications device;

a device manager in the local area network comprising a second wireless local area network transceiver, a processor and a memory, the memory containing instructions that, when executed by the processor, cause the processor to receive the message via the second wireless local area network transceiver and to perform a detection task, the detection task comprising determining a location of the mobile cellular voice communications device using the information contained in the message, determining a location of a second mobile cellular voice communications device using a second message, and granting to a user of the mobile cellular voice communications device access to a physical area based on proximities of both the mobile cellular voice communications device and the second mobile cellular voice communications device to the detection device.

20. The device manager system of claim 19, wherein the device manager receives an identifier of the first mobile cellular voice communications device from at least two detection devices, and the detection task includes determining a location of the mobile cellular voice communications device based on predetermined positions of the at least two detection devices and on a signal strength of the short range signals received by each one of the at least two detection devices.

* * * * *